(12) United States Patent
Zhai et al.

(10) Patent No.: US 12,537,253 B2
(45) Date of Patent: Jan. 27, 2026

(54) HIGH-CAPACITY BATTERY MANUFACTURING METHOD AND HIGH-CAPACITY BATTERY

(71) Applicant: AMERICA NATIONAL POWER STORAGE LLC, Lewes, DE (US)

(72) Inventors: Tengfei Zhai, Xi'an (CN); Zhengjun Lei, Xi'an (CN); Sanxue Zhang, Xi'an (CN); Gaofeng Zheng, Xi'an (CN); Yi Liu, Xi'an (CN)

(73) Assignee: AMERICA NATIONAL POWER STORAGE LLC, Lewes, DE (US)

( * ) Notice: Subject to any disclaimer, the term of this patent is extended or adjusted under 35 U.S.C. 154(b) by 691 days.

(21) Appl. No.: 17/898,795

(22) Filed: Aug. 30, 2022

(65) Prior Publication Data

US 2023/0067969 A1 Mar. 2, 2023

Related U.S. Application Data

(60) Provisional application No. 63/238,219, filed on Aug. 30, 2021.

(51) Int. Cl.
*H01M 50/204* (2021.01)
*H01M 10/052* (2010.01)
*H01M 10/0585* (2010.01)
*H01M 10/0587* (2010.01)
*H01M 50/121* (2021.01)
*H01M 50/636* (2021.01)

(52) U.S. Cl.
CPC ....... *H01M 50/204* (2021.01); *H01M 10/052* (2013.01); *H01M 10/0585* (2013.01); *H01M 10/0587* (2013.01); *H01M 50/121* (2021.01); *H01M 50/636* (2021.01)

(58) Field of Classification Search
CPC .................................................. H01M 50/204
See application file for complete search history.

(56) References Cited

U.S. PATENT DOCUMENTS

| | | | | |
|---|---|---|---|---|
| 6,670,077 B1 * | 12/2003 | Huang | ................ | H01M 50/469 429/250 |
| 2003/0052689 A1 * | 3/2003 | Jang | .................... | H01M 10/482 324/430 |

(Continued)

*Primary Examiner* — Maria Laios
*Assistant Examiner* — Jade Serena Simmons
(74) *Attorney, Agent, or Firm* — Scully, Scott, Murphy & Presser, P.C.

(57) ABSTRACT

Disclosed are a high-capacity battery manufacturing method and a high-capacity battery, which mainly solve the problems of poor consistency, unstable performance and poor overall working performance of existing high-capacity lithium batteries. The method comprises: assembling coiled or laminated units that make up high-capacity battery cells into battery cells individually, carrying out formation and capacity grading of the battery cells, grouping the battery cells according to one or more of their capacity, internal resistance, voltage and self-discharge, connecting the battery cells in the same group in shunt, loading the battery cells in the same group into a high-capacity battery pack, and then carrying out secondary electrolyte injection, sealing, aging and capacity grading of the high-capacity battery pack. According to the present application, battery cell formation and capacity grading are carried out after primary electrolyte injection.

16 Claims, 6 Drawing Sheets

(56) References Cited

U.S. PATENT DOCUMENTS

| | | | |
|---|---|---|---|
| 2006/0012334 A1 | 1/2006 | Watson | |
| 2006/0091858 A1* | 5/2006 | Johnson | H02J 7/0034 |
| | | | 320/128 |
| 2006/0188785 A1* | 8/2006 | Inoue | H01M 50/46 |
| | | | 429/251 |
| 2011/0091749 A1* | 4/2011 | Chow | H01M 50/367 |
| | | | 429/50 |
| 2012/0060360 A1* | 3/2012 | Liu | H01M 10/0525 |
| | | | 29/623.2 |
| 2020/0136204 A1 | 4/2020 | Pilawa et al. | |

* cited by examiner

HIGH-CAPACITY BATTERY MANUFACTURING METHOD AND HIGH-CAPACITY BATTERY

CROSS-REFERENCE TO RELATED APPLICATIONS

This application claims priority to U.S. Provisional Application No. 63/238,219, filed on Aug. 30, 2021, the subject matter of which is hereby incorporated by reference in its entirety.

TECHNICAL FIELD

The present application belongs to the technical field of lithium batteries, in particular to a high-capacity battery manufacturing method and a high-capacity battery.

BACKGROUND

Usually, square lithium iron phosphate batteries available in the market have a maximum capacity of 400 Ah, and cylindrical batteries have a maximum capacity not higher than 100 Ah. However, with the rise of new energy cars and new energy public transport vehicles, the demand for lithium-ion batteries with higher capacity is increasing continuously. A number of groups of battery cells are being connected in shunt during the manufacturing of a high-capacity lithium battery. Problems such as battery overheat, overcharge and poor consistency may occur frequently during the use of high-capacity batteries. Besides, a number of groups of battery cells may be quite different from each other in terms of their performance parameters such as capacity, electric resistance and voltage, etc. in the process of shunt connection if the connection or alignment is improper. In the case that one of the battery cells has any quality defect, the performance of the entire high-capacity battery will be affected, resulting in poor consistency among the battery cells connected in shunt, and poor performance stability and high rejection ratio of high-capacity batteries. In addition, most of the existing high-capacity lithium batteries are filled with and use electrolyte separately, resulting in poor overall performance of the high-capacity lithium batteries.

SUMMARY

In view of the problems of poor consistency, unstable performance and poor overall working performance of existing high-capacity lithium batteries, the present application provides a high-capacity battery manufacturing method and a high-capacity battery.

In the method according to the present application, battery cell formation and capacity grading are carried out after primary electrolyte injection, a plurality of battery cells of the same grade are loaded into a high-capacity battery pack and connected in shunt, and then secondary electrolyte injection into the high-capacity battery pack is carried out. Thus, the consistency among the high-capacity battery cells connected in shunt is improved, and the quality control efficiency and the quality of the high-capacity battery are improved as well.

The technical scheme of the present application is as follows:

A high-capacity battery manufacturing method, comprising the following steps: assembling coiled or laminated units that make up high-capacity battery cells into battery cells, and carrying out formation and capacity grading of the battery cells; and grouping the battery cells into groups according to one or more of their capacity, internal resistance, voltage and self-discharge, connecting the battery cells in the same group in shunt, loading the battery cells in the same group into a high-capacity battery pack, carrying out secondary electrolyte injection into the high-capacity battery pack, so that electrolyte in the battery cells is in communication with electrolyte in the high-capacity battery pack, and then carrying out sealing, aging and capacity grading of the high-capacity battery pack.

Furthermore, the coiled or laminated units of the high-capacity battery cell comprise at least one coiled battery cell or laminated battery cell.

Furthermore, the battery cells made of at least one coiled battery cell or laminated battery cell are graded specifically into grade A, grade B or grade C according to one or more of their capacity, internal resistance, voltage and self-discharge.

Furthermore, grade C battery cells are weeded out, at least one grade A battery cell is combined with grade A battery cells, and grade B battery cells are combined with grade B battery cells, the battery cells are unpacked, and the combined battery cells are loaded into a high-capacity battery pack.

Furthermore, secondary electrolyte injection is carried out after the combined battery cells are loaded into the high-capacity battery pack, then the electrolyte injection port of the high-capacity battery is sealed after the secondary electrolyte injection, and the high-capacity battery is aged and capacity-graded after being sealed.

Furthermore, the high-capacity battery cell comprises a battery cell shell made of a plastic material, with a protruding conduit arranged on the battery cell shell.

Furthermore, the high-capacity battery cell further comprises a battery cell body, the battery cell shell encapsulates the battery cell body, and the conduit is in communication with an electrolyte cavity of the battery cell body.

Furthermore, the melting point of the plastic material is higher than 130° C., and the plastic material is one or a combination of two or more of polyformaldehyde, polyvinyl chloride, polypropylene, polyamide, polyethylene terephthalate, polybutylene terephthalate, polycarbonate and polyester resin.

Furthermore, an end opening of the conduit is sealed, an outer side wall of the conduit is provided with a weakening groove, and an end of the conduit is provided with a pull ring.

Furthermore, the conduit is an electrolyte injection tube.

Furthermore, connecting the battery cells in the same group specifically comprises: placing a plurality of battery cells on a pressing bracket, stacking the plurality of battery cells in the electrolyte cavity of the high-capacity battery pack from bottom to top sequentially, and connecting the plurality of high-capacity battery cells in shunt via shunt busbars.

Furthermore, loading the high-capacity battery cells connected in shunt into the high-capacity battery pack and then carrying out secondary electrolyte injection, sealing, aging and capacity grading specifically comprises: placing the high-capacity battery cells connected in shunt in the electrolyte cavity of the high-capacity battery pack, and then opening the conduit on each high-capacity battery cell; alternatively, opening the conduit on each high-capacity battery cell, and then placing the high-capacity battery cells in the electrolyte cavity of the high-capacity battery pack; making the electrolyte cavities of the high-capacity battery cells communicate with the electrolyte cavity of the high-capacity battery pack, vacuumizing the electrolyte cavity of the high-capacity battery pack, filling electrolyte into the electrolyte cavity of the high-capacity battery pack, and then mounting a pressure relief component at the electrolyte injection port of the high-capacity battery pack after the filling is completed.

Furthermore, the conduit is opened as follows: winding a conduit pull wire on the pull ring of each high-capacity battery cell, and pulling the conduit pull wire to break the conduit along the weakening groove to open the conduit.

In addition, the present application further provides a high-capacity battery, which is a high-capacity battery prepared with the high-capacity battery manufacturing method described above.

Compared with the prior art, the present application attains the following beneficial effects:

Firstly, the high-capacity battery manufacturing method provided by the present application comprises: assembling coiled or laminated units that make up high-capacity battery cells into battery cells, and carrying out formation and capacity grading of the battery cells; and grouping the battery cells into groups according to one or more of their capacity, internal resistance, voltage and self-discharge, connecting the battery cells in the same group in shunt, loading the battery cells in the same group into a high-capacity battery pack, carrying out secondary electrolyte injection into the high-capacity battery pack, so that the electrolyte in the battery cells is in communication with the electrolyte in the high-capacity battery pack, and then carrying out sealing, aging and capacity grading of the high-capacity battery pack. In the method according to the present application, battery cell formation and capacity grading are carried out after primary electrolyte injection, a plurality of battery cells of the same grade are loaded into a high-capacity battery pack and connected in shunt, and then secondary electrolyte injection into the high-capacity battery pack is carried out. Thus, the consistency among the high-capacity battery cells connected in shunt is improved, and the quality control efficiency and the battery quality of the high-capacity battery are improved as well.

Secondly, in the high-capacity battery manufacturing method according to the present application, formation and capacity grading are carried out for the prepared high-capacity battery cells, and grading is performed according to the result of capacity grading; high-capacity battery cells of the same grade are arranged in the electrolyte cavity of the same high-capacity battery pack, so that the problem of non-consistency of performance parameters such as capacity, resistance, voltage, and self-discharge of the battery cells in the same high-capacity battery pack is avoided, and the consistency of the high-capacity battery cells connected in shunt is improved.

Thirdly, the high-capacity battery cell in the method according to the present application comprises a battery cell shell made of a plastic material; by using a plastic material, the manufacturing cost of a lithium battery can be reduced significantly, and the product quality is the same as that of the existing products. The battery cell shell is provided with a protruding conduit, through which the electrolyte cavities of the battery cell shells can be in communication with the external space.

Fourthly, in the method according to the present application, the high-capacity battery cell further comprises a battery cell body, the battery cell shell encapsulates the battery cell body, and the conduit is in communication with an electrolyte cavity of the battery cell body; the end opening of the conduit is sealed, and an outer side wall of the conduit is provided with a weakening groove; a pull ring is arranged at an end of the conduit; in use, the conduit can be broken along weakening groove by pulling it with the pull ring, so that the electrolyte cavity of the battery cell body in the battery cell shell is in communication with the external space.

Fifthly, in the method according to the present application, the electrolyte cavities of the plurality of high-capacity battery cells are in communication with the electrolyte cavity of the high-capacity battery pack through the conduit, so that the electrolyte cavities of the high-capacity battery cells and the electrolyte cavity of the high-capacity battery pack share the electrolyte, thereby the working performance of the high-capacity lithium battery is improved; moreover, in the case that one of the high-capacity battery cells is damaged, the other high-capacity battery cells can still be conducted and work normally through the connections via the shunt busbars.

Sixthly, in the method according to the present application, the high-capacity battery further comprises a pressing bracket, which is arranged in the electrolyte cavity of the high-capacity battery pack. With the pressing bracket, the stability of placement of the high-capacity battery cells is improved, misalignment among the high-capacity battery cells is prevented, and the problem of damage of the battery cells incurred by improper connection or alignment in the process of shunt connection is prevented effectively; with the shunt-connected high-capacity battery in the present application, the quality consistency and yield of high-capacity batteries can be greatly improved.

Lastly, in the method according to the present application, a combined top cover of the high-capacity battery pack is provided with a pressure relief port, and a pressure relief component is mounted to the pressure relief port, and is in communication with the electrolyte cavity of the high-capacity battery pack. The electrolyte can also be filled through the pressure relief port, which is to say, the pressure relief port may be used as an electrolyte injection port. The pressure relief component is mounted to the pressure relief port after the electrolyte injection. The pressure relief component can facilitate gas discharge and pressure relief in the case that gas is produced owing to thermal runaway of the high-capacity battery.

Other advantages, objects and features of the embodiments of the present application will be reflected partially by the following description, and will be understood by those skilled in the art partially through the study and practice of the embodiments of the present application.

BRIEF DESCRIPTION OF THE DRAWINGS

To make the technical scheme in the embodiments of the present application or in the prior art understood better, hereunder the accompanying drawings used in the description of the embodiments or the prior art will be introduced briefly. Apparently, the accompanying drawings described below only illustrate some embodiments of the present application. Those having ordinary skills in the art can obtain drawings of other embodiments on the basis of these drawings without expending any creative labor.

DETAILED DESCRIPTION OF THE EMBODIMENTS

Hereunder the present application will be detailed in embodiments, with reference to the accompanying drawings. Those skilled in the art should understand that those embodiments are only intended to explain the technical principle of the present application, rather than to limit the scope of protection of the present application.

For a high-capacity battery, the consistency of electric resistance, capacity, voltage and self-discharge among the coiled or laminated battery cells inside the battery are the key indexes. If coiled or laminated battery cells with poor consistency are used, the battery may have many defects, such as out-of-specification of the capacity, battery overheat, overcharge and poor consistency. In view of the above considerations, the present application proposes a high-capacity battery manufacturing method.

Figure 1:
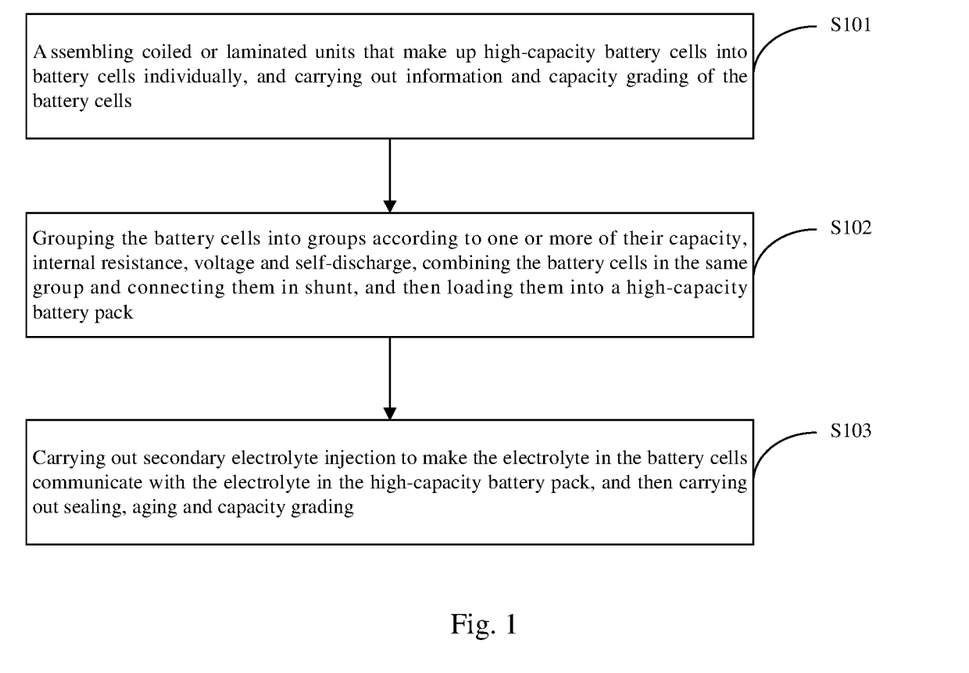
FIG. 1 is a schematic diagram of the high-capacity battery manufacturing method according to the present application.

FIG. 1 shows a flow chart of the high-capacity battery manufacturing method provided by the present application. The method comprises the following steps S101 to S103:

S101: assembling coiled or laminated units that make up high-capacity battery cells into battery cells individually, and carrying out formation and capacity grading of the battery cells;

S102: grouping the battery cells into groups according to one or more of their capacity, internal resistance, voltage and self-discharge, combining the battery cells in the same group and connecting them in shunt, and then loading them into a high-capacity battery pack; and S103: carrying out secondary electrolyte injection to make the electrolyte in the battery cells communicate with the electrolyte in the high-capacity battery pack, and then carrying out sealing, aging and capacity grading.

The coiled or laminated units of the above-mentioned high-capacity battery cell comprise at least one coiled battery cell or laminated battery cell. First of all, at least one coiled battery cell or laminated battery cell is made into a battery cell, and formation and capacity grading of the battery cell are carried out; each battery cell made of at least one coiled battery cell or laminated battery cell is graded according to one or more of its capacity, internal resistance, voltage and self-discharge; and the battery cells made of at least one coiled battery cell or laminated battery cell is graded into grade A, grade B or grade C according to the result of the above grading criteria. Grade C battery cells are weeded out, at least one grade A battery cell is combined with grade A battery cells, grade B battery cells are combined with grade B battery cells, and the battery cells are unpacked and loaded into a high-capacity battery pack.

Secondary electrolyte injection is carried out after the combined battery cells are loaded into the high-capacity battery pack, then the electrolyte injection port of the high-capacity battery is sealed, and the high-capacity battery is aged and capacity-graded after being sealed.

Before the secondary electrolyte injection, it is necessary to open the battery cell (i.e., unpack the battery cell) so that the inner cavity of the battery cell communicates with the inner cavity of the high-capacity battery pack. After the secondary electrolyte injection, the electrolyte in the battery cell communicates with the electrolyte in the high-capacity battery pack. Alternatively, the battery cell shell is provided with a dissoluble sheet that can be dissolved in the electrolyte. The dissoluble sheet is formed when the battery cell is being manufactured. After the secondary electrolyte injection, the electrolyte in the battery pack can dissolve the dissoluble sheet, so that the electrolyte in the battery cell can communicate with the electrolyte in the high-capacity battery pack. Specifically, the dissoluble sheet is made of a material that can be dissolved in the electrolyte, such as polymethylmethacrylate, polyvinyl chloride, polycarbonate or ABS plastic material. To prevent the dissoluble sheet from being dissolved in the electrolyte in the battery cell before the second electrolyte injection, an isolating film may be arranged on a side of the dissoluble sheet facing the inside of the battery cell. The isolating film is insoluble in the electrolyte, but it can fall off after the dissoluble sheet is dissolved, so that the electrolyte in the battery cell can communicate with the electrolyte in the high-capacity battery pack.

Embodiment 1

Ten groups of laminated battery cells, each of which has 100 Ah capacity, are used for a high-capacity battery with 1,000 Ah capacity. First, positive and negative electrodes are prepared, coated, compacted, cut, and laminated to a laminated battery cell, the laminated battery cell is soldered with positive and negative electrodes and packed in a simple soft bag, the soft bag is filled with electrolyte and vacuumized, and formation and capacity grading are carried out, then the battery cell is graded into grade A, grade B, or grade C according to its internal resistance, i.e., $0.5\ m\Omega \leq R < 0.55\ m\Omega$ (grade A), $0.55\ m\Omega \leq R \leq 0.6\ m\Omega$ (grade B), and $R > 0.6\ m\Omega$ (grade C). Any grade C battery cell is regarded as being unacceptable; then, the battery cells with internal resistance within the same resistance interval are further grouped by voltage and capacity according to the criteria that the voltage difference among the battery cells in each group is smaller than or equal to 10 mV and the capacity difference among the battery cells in each group is smaller than or equal to 2 Ah. Then, the battery cells in the same group are connected in shunt via electrode posts, unpacked and compacted, and loaded into a high-capacity battery pack, and the combined top cover is mounted on the high-capacity battery pack; then the high-capacity battery pack is vacuumized, filled with the electrode, and sealed, to form a 1,000 Ah high-capacity battery with high consistency; then the high-capacity battery is aged and capacity-graded.

In the high-capacity battery manufacturing method provided in this embodiment, coiled or laminated battery cells that make up high-capacity battery cells are assembled into a battery cell individually, and formation and capacity grading are carried out, then the battery cells are grouped into similar groups according to one or more of their capacity, internal resistance, voltage and self-discharge, the battery cells in the same group are combined and connected in shunt, the combined battery cells are loaded into a high-capacity battery pack, then secondary electrolyte injection is carried out, so that the electrolyte in the battery cells is in communication with the electrolyte in the high-capacity battery pack, and then the battery is sealed, aged, and capacity-graded.

Battery cell formation and capacity grading are carried out after primary electrolyte injection, a plurality of battery cells of the same grade are loaded into a high-capacity battery pack and connected in shunt, and then secondary electrolyte injection into the high-capacity battery pack is carried out. Thus, the consistency among the high-capacity battery cells connected in shunt is improved, and the quality control efficiency and the battery quality of the high-capacity battery are improved as well.

This embodiment further provides a high-capacity battery, which is prepared through the formation and capacity grading process of a high-capacity battery as described in the above embodiment. In this embodiment, formation and capacity grading are carried out for the battery cells after the primary electrolyte injection, a number of battery cells of the same grade are connected in shunt and loaded into a high-capacity battery pack, and then electrolyte is injected into the high-capacity battery pack. Thus, the consistency among the battery cells of a high-capacity battery is improved, and the efficiency of quality control and the quality of the battery are improved as well.

Embodiment 2

Figure 2:
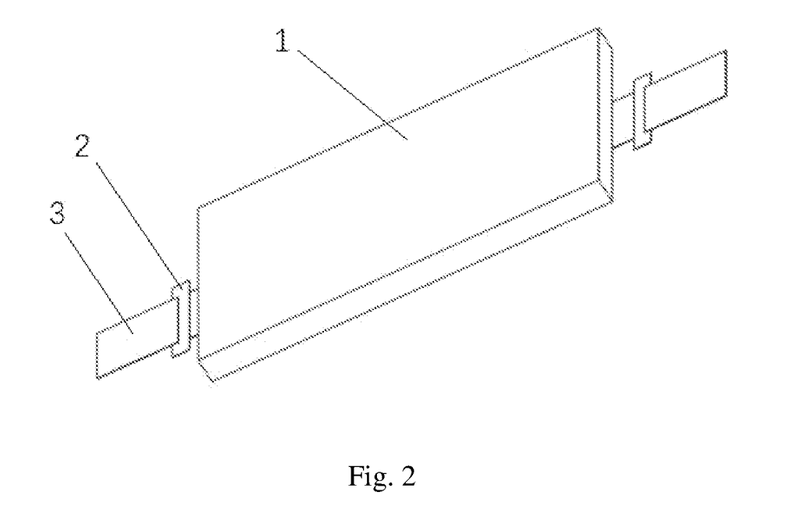
FIG. 2 is a first schematic structural diagram of the high-capacity battery cell in the method in an embodiment 2 of the present application.
Figure 3:
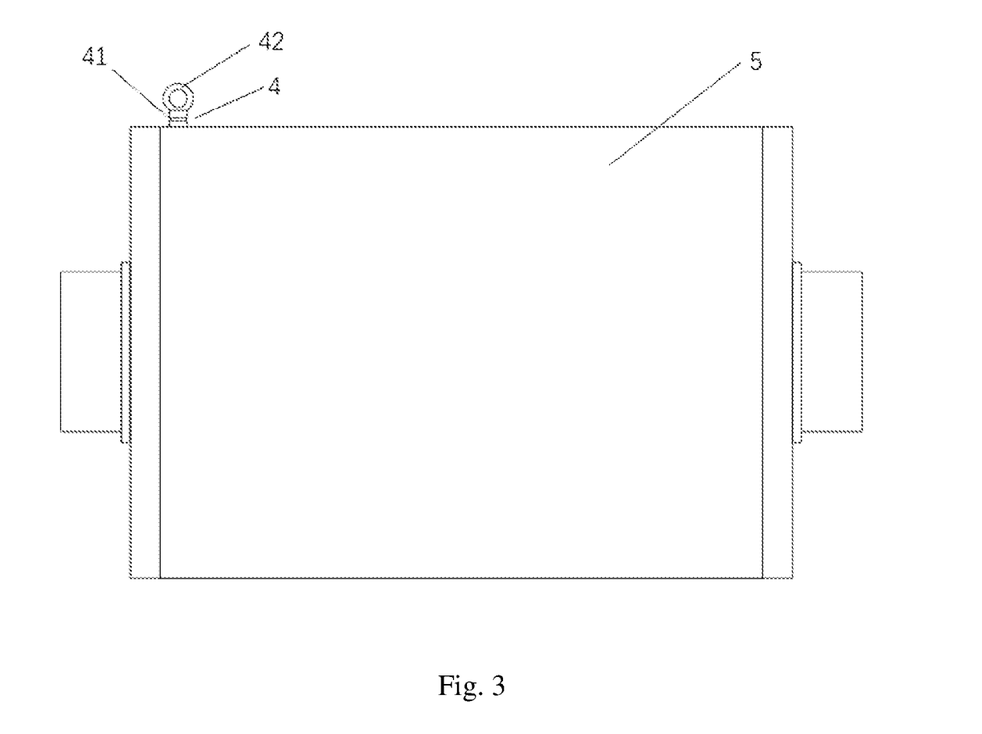
FIG. 3 is a second schematic structural diagram of the high-capacity battery cell in the method in the embodiment 2 of the present application.

The assembling method of the shunt-connected high-capacity battery cells in this embodiment comprises the following steps:

1) a mounting slot is punched at the center of a side of the battery cell shell 5, a battery cell connected with conductive connecting plates 2 and tab current collectors 3 is placed in the mounting slot, the sides of the battery cell shell 5 are pressed together at the other side of the opening of the mounting slot where the battery cell shell 5 is disposed, to form an electrolyte cavity of the battery cell body 1 inside the battery cell shell 5; specifically, in the pressing process, three sides of the battery cell shell 5 are pressed together first, so that the battery cell shell 5 are sealed at the three sides but open at the other side; electrolyte is injected into the electrolyte cavity of the battery cell body 1 through the opening, and the open side is sealed after the electrolyte injection. Alternatively, four sides are pressed together in the pressing process, electrolyte is injected into the electrolyte cavity of the battery cell body 1 through the conduit 4, the conduit 4 is sealed after the electrolyte injection, and the conduit 4 is in communication with the electrolyte cavity of the battery cell body 1; thus a battery cell is formed.

The capacity of each battery cell is graded, and then the battery cells are graded according to their capacity range, internal resistance range, self-discharge range and voltage range after the capacity grading is completed. In this embodiment, battery cells with capacity within a range of 40-40.5 Ah, internal resistance within a range of 0.9-1 mΩ, self-discharge within a range of 0-2% per month, and voltage within a range of 3.2±0.1 V are graded as grade A; battery cells with capacity within a range of 39.5-40 Ah, internal resistance within a range of 1-1.1 mΩ, self-discharge within a range of 2%-4% per month, and voltage within a range of 3.2±0.01 V are graded as grade B; and battery cells with capacity lower than 39.5 Ah or higher than 40.5 Ah, internal resistance lower than 0.9 mΩ or higher than 1.1 mΩ, self-discharge higher than 4% per month, and voltage outside a range of 3.2±0.01 V are graded as grade C.

Figure 5:
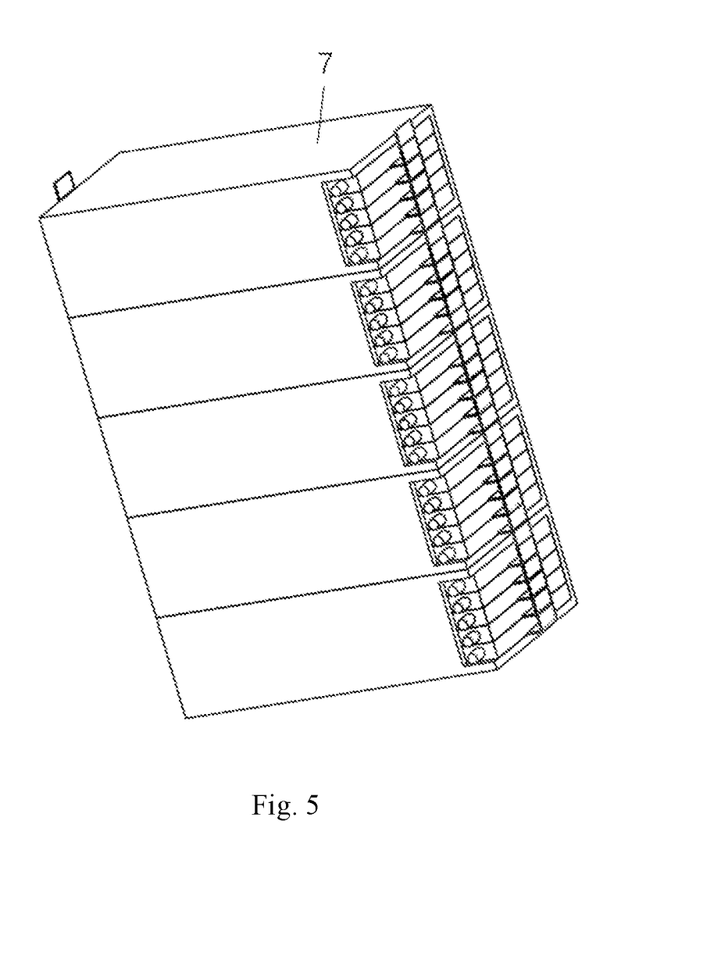
FIG. 5 is a schematic diagram of the connection between the pressing bracket and the battery cells in the method in the embodiment 2 of the present application.
Figure 6:
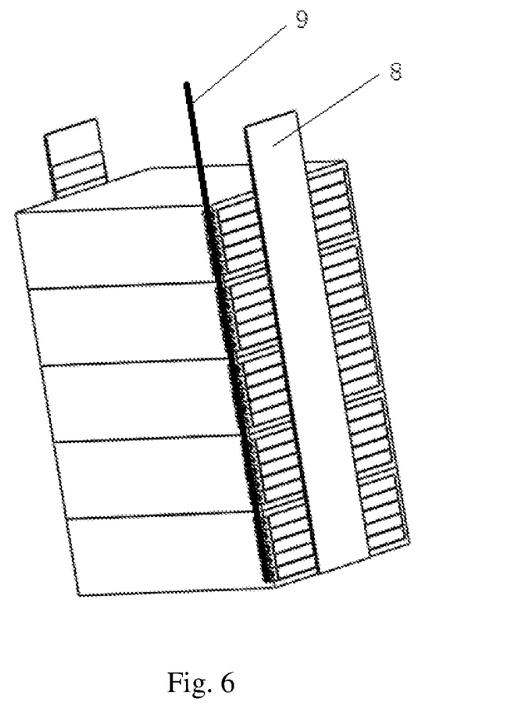
FIG. 6 is a schematic diagram of the connection of the shunt busbar in the method in the embodiment 2 of the present application.
Figure 7:
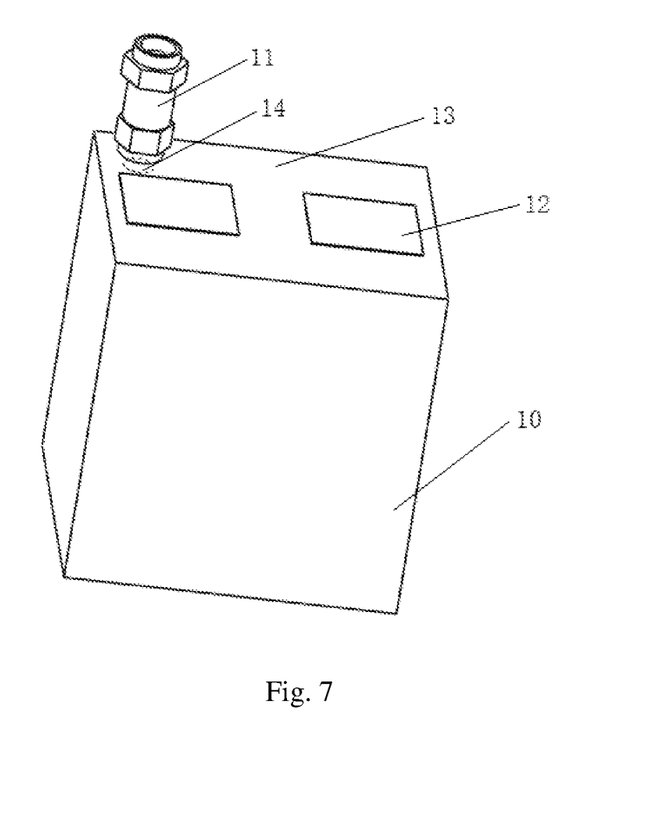
FIG. 7 is a schematic structural diagram of the high-capacity battery connected in shunt in the method in the embodiment 2 of the present application.

Twenty-five high-capacity battery cells of the same grade are respectively placed in the accommodating slots of a pressing bracket 7 sequentially, the positive tab current collectors on the twenty-five high-capacity battery cells are connected in shunt to a shunt busbar 8, the negative tab current collectors on the twenty-five high-capacity battery cells are connected in shunt to another shunt busbar 8, the top of the high-capacity battery pack 10 is covered with a combined top cover 13, the shunt busbar 8 connected with the positive tab current collectors is connected to a positive electrode post, and the shunt busbar 8 connected with the negative tab current collectors is connected to a negative electrode post, so as to form a shunt-connected high-capacity battery.

The shunt-connected high-capacity battery is placed in the electrolyte cavity of a high-capacity battery pack 10, and a conduit pull wire 9 is wound on the pull ring 42 on the conduit 4 of each high-capacity battery cell. The top of the high-capacity battery pack 10 is covered by the combined top cover 13, and the conduit pull wire 9 is inserted through the pressure relief port 14 on the combined top cover 13 and is pulled to break the conduit 4 along the weakening groove 41, so that the conduit 4 is opened. Alternatively, a conduit pull wire 9 is wound on the pull ring 4 on the conduit 4 on each high-capacity battery cell, and the conduit pull wire 9 is pulled to break the conduit 4 along the weakening groove 41 to open the conduit, and then the shunt-connected high-capacity battery is placed in the electrolyte cavity of the high-capacity battery pack body 10; and the electrolyte cavity of each high-capacity battery cell is in communication with the electrolyte cavity of the battery case 10 through the conduit 4.

The electrolyte cavity of the high-capacity battery pack 10 is vacuumized through the pressure relief port 14, and electrolyte is filled into the electrolyte cavity of the high-capacity battery pack 10 through a filling valve, so that a common electrolyte system is formed between each high-capacity battery cell and the high-capacity battery pack 10; after the filling, a pressure relief valve 11 or explosion relief membrane is mounted to the pressure relief port 14.

As shown in FIGS. 2 and 3, the high-capacity battery cell in this embodiment comprises a battery cell shell 5 and a battery cell body 1, wherein the battery cell shell 5 is made of a plastic material, and a protruding conduit 4 is arranged on the battery cell shell 5, the battery cell shell 5 encapsulates the battery cell body 1, and the conduit 4 is in communication with the electrolyte cavity of the battery cell body 1.

It should be noted especially that the plastic material in this embodiment is one or a combination of two or more of polyformaldehyde, polyvinyl chloride, polypropylene, polyamide, polyethylene terephthalate, polybutylene terephthalate, polycarbonate and polyester resin. Preferably, the plastic material in this embodiment is polypropylene.

In this embodiment, the two opposite sides of the battery cell body 1 are connected with a tab current collector 3 respectively, wherein the tab current collector 3 on one side is a positive tab current collector and the tab current collector 3 on the other side is a negative tab current collector. In use, a mounting groove is pressed on one side of the battery cell shell 5, the battery cell body 1 is placed in the mounting groove, the sides of the battery cell shell 5 are pressed together at the other side of the battery cell body 5 arranged at the opening of the mounting groove, so that the battery cell shell 5 encapsulate and seal the battery cell body 1. An electrolyte cavity of the battery cell body 1 is formed inside the battery cell shell 5. In the pressing process, three sides are pressed together first to seal the three sides, while the other side is arranged with an opening. The electrolyte is filled into the electrolyte cavity of the battery cell body 1 through the opening, and the opening is sealed after the electrolyte is filled. Alternatively, four sides are pressed together in the pressing process, electrolyte is injected into the electrolyte cavity of the battery cell body 1 through the conduit 4, the conduit 4 is sealed after the electrolyte injection, and the conduit 4 is in communication with the electrolyte cavity of the battery cell body 1. The tab current collectors 3 extend to the outside of the battery cell shell 5.

Figure 4:
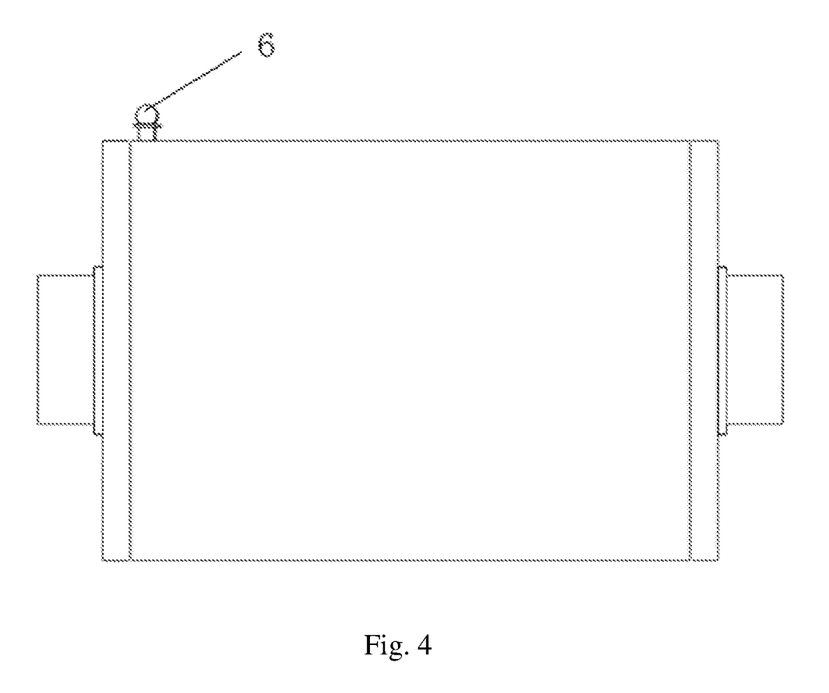
FIG. 4 is a third schematic structural diagram of the high-capacity battery cell in the method in the embodiment 2 of the present application.

It should be noted that an annular weakening groove 41 is arranged in the outer side wall of the conduit 4 and a pull ring 42 is provided at the end port of the conduit 4 in this embodiment. As shown in FIG. 4, in this embodiment, the end of the conduit 4 may be directly sealed with a sealing cap 6 if no weakening groove 41 or the pull ring 42 is arranged on the conduit 4; when the conduit is to be pulled to break, it can be broken from the connection between the conduit 4 and the sealing cap 6.

Preferably, the battery cell in this embodiment is a coil battery cell or a laminated battery cell. The high-capacity battery cell in this embodiment further comprises conductive connecting plates 2, the battery cell body 1 is electrically connected to the positive tab current collector and the negative tab current collector via the conductive connecting plates 2, and the conductive connecting plates 2 are arranged at the sealed connections of the battery cell shell 5. Preferably, in this embodiment, adhesive is provided at the connections between the conductive connecting plates 2 and the battery cell shell 5, and the conductive connecting plates 2 fixed to and sealed against the battery cell shell 5 via the adhesive, so as to prevent the electrolyte from leaking from the connections between the conductive connecting plates 2 and the battery cell shell 5.

Embodiment 3

As shown in FIGS. 5 to 7, this embodiment provides a high-capacity battery, which comprises a high-capacity battery pack 10, shunt busbars 8, and twenty-five high-capacity battery cells stacked in an electrolyte cavity of the high-capacity battery pack 10 from bottom to top. Two shunt busbars 8 are arranged outside the high-capacity battery cells, and the positive electrode tab current collectors of the twenty-five disposable lithium battery cells are connected in shunt to one shunt busbar 8, while the negative electrode tab current collectors of the twenty-five disposable lithium battery cells are connected in shunt to the other shunt busbar 8. The top of the high-capacity battery pack 10 has a top opening, where the high-capacity battery pack 10 is provided with a combined top cover 13; two electrode posts 12, namely, a positive electrode post and a negative electrode post, are arranged on the combined top cover 13, and the positive electrode post is connected to the shunt busbar 8 that is connected with the positive electrode tab current collector, while the negative electrode post is connected to the shunt busbar 8 that is connected with the negative electrode tab collector. The electrolyte cavity of the high-capacity battery pack 10 is filled with an electrolyte. After the conduit 4 is connected, the electrolyte in the electrolyte cavities of the twenty-five high-capacity battery cells is in communication with the electrolyte in the electrolyte cavity of the high-capacity battery pack 10 through the conduit 4, so that the high-capacity battery cells share the electrolyte with the high-capacity battery pack 10. The electrolyte cavity of the high-capacity battery pack refers to the space in the inner cavity of the high-capacity battery pack that is not intended to receive the high-capacity battery cells.

It should be noted especially that the plastic material of the battery cell shell 5 in this embodiment is one or a combination of two or more of polyformaldehyde, polyvinyl chloride, polypropylene, polyamide, polyethylene terephthalate, polybutylene terephthalate, polycarbonate and polyester resin.

Preferably, the high-capacity battery in this embodiment further comprises a pressing bracket 7, on which twenty-five accommodating slots are arranged sequentially from bottom to top, and each accommodating slot accommodates a high-capacity battery cell correspondingly. The tab current collectors 3 extend to the outside of the accommodating slots and are connected with the shunt busbars 8. After the high-capacity battery cells are placed in the accommodating slots, the high-capacity battery cells and the pressing bracket 7 are placed in the electrolyte cavity of the high-capacity battery pack body 10 together.

Preferably, in this embodiment, in the case that the two opposite sides of the battery cell body 1 are connected with the tab current collectors 3, the accommodating slots are through-slots, and the tab current collectors 3 on both sides extend outward from the openings on the two sides of the accommodating grooves; alternatively, in the case that the tab current collectors 3 are arranged on one side of the battery cell body 1, the accommodating slots are not through-slots, but are open only on one side, and the tab current collectors 3 extend outward from the same opening; the number of the accommodating slots may be determined according to the number of high-capacity battery cells, and the number of the accommodating slots are in one-to-one correspondence to the number of the high-capacity battery cells.

The high-capacity battery in this embodiment is provided with a pressure relief port 14 on the combined top cover 13, and a pressure relief component is mounted to the pressure relief port 14, and is in communication with the electrolyte cavity of the high-capacity battery pack 10. Preferably, the pressure relief port 14 in this embodiment can serve as an electrolyte injection port when the electrolyte is filled into the electrolyte cavity of the high-capacity battery case 10. Preferably, the pressure relief component in this embodiment is a pressure relief valve 11 or an explosion relief membrane.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

The invention claimed is:

1. A high-capacity battery manufacturing method, comprising:
   assembling coiled or laminated units that make up high-capacity battery cells into battery cells, and carrying out formation and capacity grading of the battery cells; and
   grouping the battery cells into groups according to one or more of their capacity, internal resistance, voltage and self-discharge, connecting the battery cells in the same group in shunt, loading the battery cells in the same group into a high-capacity battery pack, carrying out secondary electrolyte injection into the high-capacity battery pack, so that electrolyte in the battery cells is in communication with electrolyte in the high-capacity battery pack, and then carrying out sealing, aging and capacity grading of the high-capacity battery pack;

wherein the coiled or laminated units of the high-capacity battery cell comprise at least one coiled battery cell or laminated battery cell; the battery cells made of at least one coiled battery cell or laminated battery cell are graded specifically into grade A, grade B or grade C according to one or more of their capacity, internal resistance, voltage and self-discharge; grade C battery cells are weeded out, at least one grade A battery cell is combined with grade A battery cells, and grade B battery cells are combined with grade B battery cells, the battery cells are unpacked, and the combined battery cells are loaded into a high-capacity battery pack; secondary electrolyte injection is carried out after the combined battery cells are loaded into the high-capacity battery pack, then the electrolyte injection port of the high-capacity battery is sealed after the secondary electrolyte injection, and the high-capacity battery is aged and capacity-graded after being sealed.

2. The high-capacity battery manufacturing method according to claim 1, wherein the high-capacity battery cell comprises a battery cell shell made of a plastic material, with a protruding conduit arranged on the battery cell shell.

3. The high-capacity battery manufacturing method according to claim 2, wherein the high-capacity battery cell further comprises a battery cell body, the battery cell shell encapsulates the battery cell body, and the conduit is in communication with an electrolyte cavity of the battery cell body.

4. The high-capacity battery manufacturing method according to claim 3, wherein a melting point of the plastic material is higher than 130° C., and the plastic material is one or a combination of two or more of polyformaldehyde, polyvinyl chloride, polypropylene, polyamide, polyethylene terephthalate, polybutylene terephthalate, polycarbonate and polyester resin.

5. The high-capacity battery manufacturing method according to claim 2, wherein an end opening of the conduit is sealed, an outer side wall of the conduit is provided with a weakening groove, and an end of the conduit is provided with a pull ring.

6. The high-capacity battery manufacturing method according to claim 2, wherein the conduit is an electrolyte injection tube.

7. The high-capacity battery manufacturing method according to claim 1, wherein connecting the battery cells in the same group specifically comprises: placing a plurality of battery cells on a pressing bracket, stacking the plurality of battery cells in the electrolyte cavity of the high-capacity battery pack from bottom to top sequentially, and connecting the plurality of high-capacity battery cells in shunt via shunt busbars.

8. The high-capacity battery manufacturing method according to claim 2, wherein loading the high-capacity battery cells connected in shunt into the high-capacity battery pack and then carrying out secondary electrolyte injection, sealing, aging and capacity grading specifically comprises:

placing the high-capacity battery cells connected in shunt in the electrolyte cavity of the high-capacity battery pack, and then opening the conduit on each high-capacity battery cell; alternatively, opening the conduit on each high-capacity battery cell, and then placing the high-capacity battery cells in the electrolyte cavity of the high-capacity battery pack; and making the electrolyte cavities of the high-capacity battery cells communicate with the electrolyte cavity of the high-capacity battery pack, vacuumizing the electrolyte cavity of the high-capacity battery pack, filling electrolyte into the electrolyte cavity of the high-capacity battery pack, and then mounting a pressure relief component at the electrolyte injection port of the high-capacity battery pack after the filling is completed.

9. The high-capacity battery manufacturing method according to claim 8, wherein the conduit is opened as follows: winding a conduit pull wire on the pull ring of each high-capacity battery cell, and pulling the conduit pull wire to break the conduit along the weakening groove to open the conduit.

10. A high-capacity battery manufactured with the high-capacity battery manufacturing method according to claim 1.

11. The high-capacity battery according to claim 10, wherein the high-capacity battery cell comprises a battery cell shell made of a plastic material, with a protruding conduit arranged on the battery cell shell.

12. The high-capacity battery according to claim 11, wherein the high-capacity battery cell further comprises a battery cell body, the battery cell shell encapsulates the battery cell body, and the conduit is in communication with an electrolyte cavity of the battery cell body.

13. The high-capacity battery according to claim 12, wherein a melting point of the plastic material is higher than 130° C., and the plastic material is one or a combination of two or more of polyformaldehyde, polyvinyl chloride, polypropylene, polyamide, polyethylene terephthalate, polybutylene terephthalate, polycarbonate and polyester resin.

14. The high-capacity battery according to claim 11, wherein an end opening of the conduit is sealed, an outer side wall of the conduit is provided with a weakening groove, and an end of the conduit is provided with a pull ring.

15. The high-capacity battery according to claim 11, wherein the conduit is an electrolyte injection tube.

16. The high-capacity battery according to claim 10, wherein connecting the battery cells in the same group specifically comprises: placing a plurality of battery cells on a pressing bracket, stacking the plurality of battery cells in the electrolyte cavity of the high-capacity battery pack from bottom to top sequentially, and connecting the plurality of high-capacity battery cells in shunt via shunt busbars.

\* \* \* \* \*